(12) United States Patent
Johansson

(10) Patent No.: US 10,694,878 B1
(45) Date of Patent: Jun. 30, 2020

(54) FLOORING GUARD FOR PETS

(71) Applicant: Bengt Johansson, Norco, CA (US)

(72) Inventor: Bengt Johansson, Norco, CA (US)

(73) Assignee: Joanne Hernandez, Norco, CA (US)

( * ) Notice: Subject to any disclaimer, the term of this patent is extended or adjusted under 35 U.S.C. 154(b) by 0 days.

(21) Appl. No.: 14/304,941

(22) Filed: Jun. 15, 2014

(51) Int. Cl.
*A01K 1/015* (2006.01)
*A47G 27/02* (2006.01)
*E04B 1/92* (2006.01)

(52) U.S. Cl.
CPC ............ *A47G 27/0206* (2013.01); *E04B 1/92* (2013.01); *A01K 1/0157* (2013.01)

(58) Field of Classification Search
CPC .. A47G 27/0206; A01K 1/0157; A47L 23/266
USPC ..................................................... 428/80, 120
See application file for complete search history.

(56) References Cited

U.S. PATENT DOCUMENTS 8,524,350 B2 * 9/2013 Lee .................................. 428/80
8,663,775 B2 * 3/2014 Bitela et al. ..................... 428/80

* cited by examiner

*Primary Examiner* — Alexander S Thomas
(74) *Attorney, Agent, or Firm* — Foley & Lardner LLP

(57) ABSTRACT

A device protects the area of a doorway defined by first and second doorjambs separated by a distance. The device includes a mat body having protrusion with a first side edge and an opposed, second side edge. The protrusion is sized and shaped to be positioned in the doorway between the first and second door jambs.

20 Claims, 5 Drawing Sheets

FLOORING GUARD FOR PETS

REFERENCE TO PRIORITY DOCUMENT

The present application claims priority to U.S. Patent Application Ser. No. 61/835,620, entitled FLOORING GUARD FOR PETS and filed Jun. 16, 2013. The disclosure of the provisional application is incorporated herein by reference in its entirety.

BACKGROUND

There is currently a large unmet need in the U.S. pet industry, in particular with respect to cats as indoor pets. There are approximately 86.4 million owned cats in the United States. Three in ten (or 38.9 million) U.S. households own at least one cat. One half of cat-owning households (52%) own one cat; the remaining (48%) own two or more.

Although cats certainly rank high on the list of America's favorite pets, the damage that cats cause to carpets by scratching is significant when viewed on an individual household basis. Millions of dollars are spent every year in replacing damaged carpets. This represents a large and challenging financial investment for the average American household.

There are a multitude of products that deal with the problem of scratching cats. Some products attempt to discourage cats from scratching, such as adhesive tape for corners of furniture and even drastic shocking devices. Other products attempt to encourage cats to scratch and sharpen their nails on specific "allowed" areas, such as various cardboard scratch-products. However, current products fail to effectively protect the perhaps most vulnerable targeted area by scratching cats—the carpet inside and around the interior doorways of people's homes. One can easily testify to this pattern of scratching behavior by simple observation—carpets in these areas are often far more damaged than other areas. Although some products are configured to fit around the doorway or area around a door, such products are configured for a tight fit so as to snap into the door jam or required to simultaneously touch opposing door jambs. Consequently, snap-in products can be too tight and, at best, are only configured for use in a door that specifically matches the shape of the device due to size variations in door moldings and baseboards, thus making it impossible to effectively satisfy the unmet needs of scratching cat owners on any significant scale.

For whatever the multitude of reasons people choose to close their doors, cats do not respond well to closed doors. Therefore cats instinctively begin to scratch and tear the carpet at doorways, making this specific area particularly vulnerable.

In view of the foregoing, there is a need for devices and methods that effectively deal with the issue of cat scratching on carpets, particularly around the areas of doors.

SUMMARY

Disclosed is a device that is configured to provide protection to a carpet in the area of a door or doorway. The device is configured to fit within or around any standard interior doorway. Advantageously, the device requires no cutting, reshaping or modification of any kind. It can simply be placed in a desired doorway for instant protection of carpet. The device is intentionally configured as to not to simultaneously touch both of the opposed door jambs of the doorway, thereby allowing an instant universal fit. For example, the device for a standard 30" door may measure 29⅛" within the door jambs. It shall be noted that the device is specifically shaped and sized for preventing and stopping scratching of the carpet in one room at a time only while the subject door is closed. The material of the device is thin enough to allow doors to be opened and closed over it while in use, yet strong and durable enough to allow foot traffic and other normal daily activities. Consequently, cat owners enjoy the flexibility of using the protection device on an on-going or as-needed basis depending on individual preference.

The details of one or more variations of the subject matter described herein are set forth in the accompanying drawings and the description below. Other features and advantages of the subject matter described herein will be apparent from the description and drawings, and from the claims.

DETAILED DESCRIPTION

In order to promote an understanding of the principals of the disclosure, reference is made to the drawings and the embodiments illustrated therein. Nevertheless, it will be understood that the drawings are illustrative and no limitation of the scope of the disclosure is thereby intended. Any such alterations and further modifications in the illustrated embodiments, and any such further applications of the principles of the disclosure as illustrated herein are contemplated as would normally occur to one of ordinary skill in the art.

Figure 1:
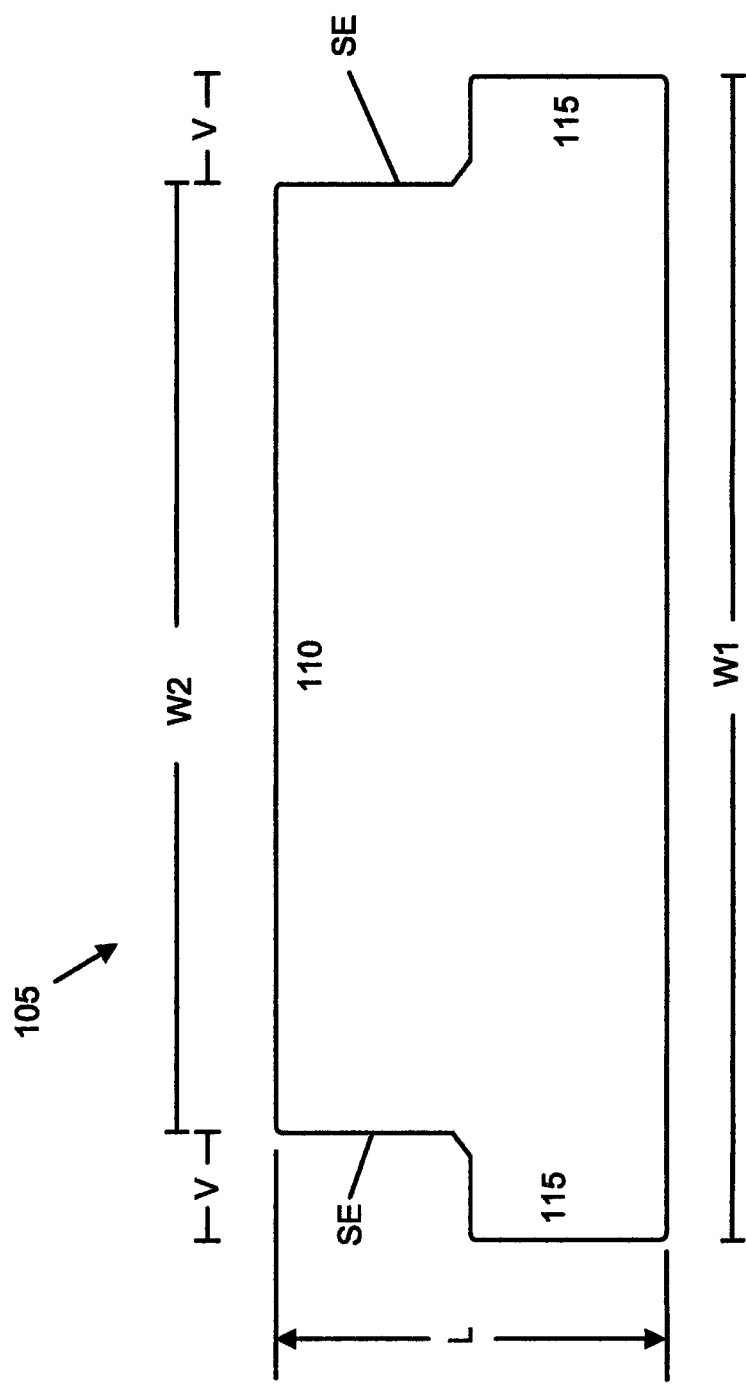
FIG. 1 shows a top, schematic view of a flooring guard device for use with cats.

FIG. 1 shows a top, schematic view of a floor guard mat or device 105 that is sized and shaped for positioning on a floor, such as in a carpeted area of a door, and used to protect the carpeted floor against scratching by a pet such as a cat. The device 105 can be used at doorways where flooring on both sides of doorway is carpeted, as well as on flooring where only one side of the doorway is carpeted and the other side has different flooring, i.e. wood, tile, linoleum or laminate. The area around the doorway that may be scratched by a pet is referred to as the "target scratch area".

As described in detail below, the device has a width that is sized to fit between a pair of door jambs (or any portion of the door frame) of a doorway. The width of the device is less than the dimension between the door jambs (or any portion of the door frame) such that the device can fit between the door jambs (or any portion of the door frame) without both opposed lateral or side edges SE of the device 105 simultaneously touching both of the opposed door jambs (or the door frame). Yet, the device is wide enough to provide maximum carpet protection to this heavily targeted cat scratch area. In a single room embodiment, the device has a length L such that the device does not simultaneously extend into two rooms (on either side of the doorway) but rather only extends into the area between the door jambs but not past the threshold of the doorjambs into a second room. Thus, in the single room embodiment, the device 105 intentionally only protects the target scratch area of one of the rooms of the doorway while purposely leaving the area of the other room on the other side of the doorway unprotected. In an embodiment, the device is specifically targeted for use with cats and for carpeted door areas.

The floor guard is a planar or pad-like device having a non-slippery top surface and a bottom surface. The bottom surface may be flat such that it can be positioned atop a carpeted floor. The device may be sufficiently flexible such that it can conform to irregularities in the surface of the floor. In an embodiment, the device is sufficiently thin that it will not interfere with a door being opened or closed over the device when the device is positioned in a doorway. For example, the device can have thickness in the range of about 1.5 mm to 2 mm although this can vary.

FIG. 1 shows an exemplary shape for the device 105 formed of a planar or substantially planar mat body having a bottom edge of a width W1. The device 105 has a protrusion 110 with opposed lateral or side edges SE that define a width W2 that fits between the door jambs of a door. The protrusion 110 is sized and shaped to fit between the opposed door jambs that define the doorway. In an embodiment, the side edges SE are straight edges rather than being contoured or custom shaped to the shape of the doorjamb. This provides the device 105 with a universal fit to door jambs of different shapes.

As mentioned, the width W2 is less than the length between the opposed door jambs of a door such that the two side edges SE cannot both simultaneously touch the respective two opposed door jambs between which the device 105 is positioned. In other words, there is some play between the door jambs and the protrusion 110 of the device 105 when the device 105 is positioned between the door jambs. This permits the device 105 to fit within doorways of different sizes without having to specifically build the device 105 to the dimensions of a specific doorway. For example the device 105 for a standard 30" width doorway (between the door jambs) may have a width W2 of 29⅛" within the actual doorframe. It should be appreciated that the device is sized and shaped to fit within any of a variety of doorways.

The device can be shaped to fit around the doorway corners and molding, if present. For example, FIG. 1 shows the device having a pair of flaps or wings 115 (each of width V) that are sized and shaped to at least partially wrap around the door jambs of a door along the wall in which the doorway is positioned. The wings 115 are positioned outside the threshold of the door jambs when the device 105 is properly positioned in the doorway. The wings 115 have side edges that are separated by the width W1.

In an embodiment, the device is manufactured of a plastic material that is lightweight. The device can be transparent or near transparent. In another embodiment, the device has a particular color, such as a color that is selected for aesthetic reasons or a color that attracts attention to reduce the risk of tripping over the device.

Figure 2:
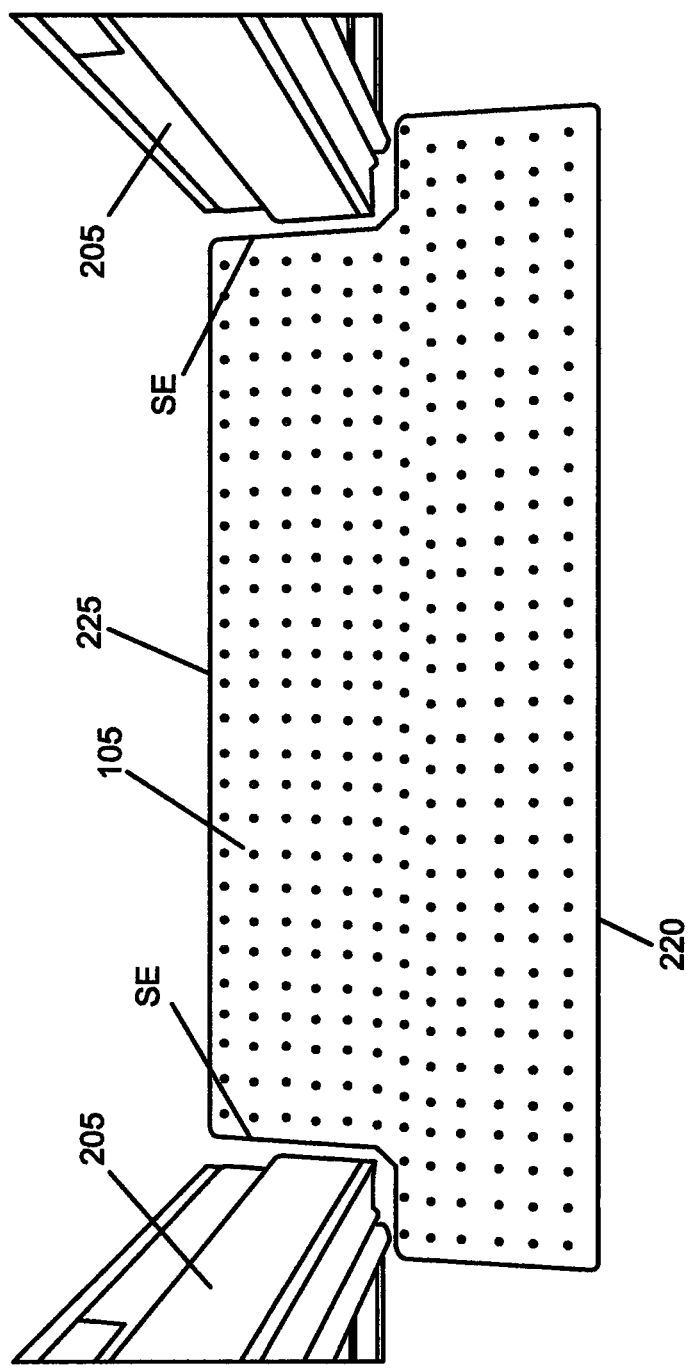
FIG. 2 shows the flooring guard on a carpet positioned at doorway of an open door (with the door removed for clarity of illustration).

FIG. 2 shows an exemplary device 105 positioned in a doorway between a pair of opposed door jambs. For clarity of illustration, the actual door is not shown in FIG. 2 although a door may be mounted in the doorway. Note that the device has a shape that is configured to fit within the doorway such that the width of the device that is positioned between the door jambs 205 is less than the dimension or width between the door jambs. In this manner, there is play between the edges of the device and the door jambs 205. In an embodiment, the width of the device between the door jambs is a predetermined distance or percentage less than the distance or width between the door jambs. For example, the width of the device 105 may be ½", ¹⁄₁₆", ⅛" or 1" less than the distance between the door jambs or any portion of the doorframes. In another embodiment, the width of the device 105 is not more than 1" less than the distance between the door jambs or any portion of the door frames. It should be appreciated that the amount of play between the device 105 and the door jambs may vary and the aforementioned values are non-limiting examples. The particular shape of the device can be varied to suit the particular shape of a doorway in which it is used.

Figure 3:
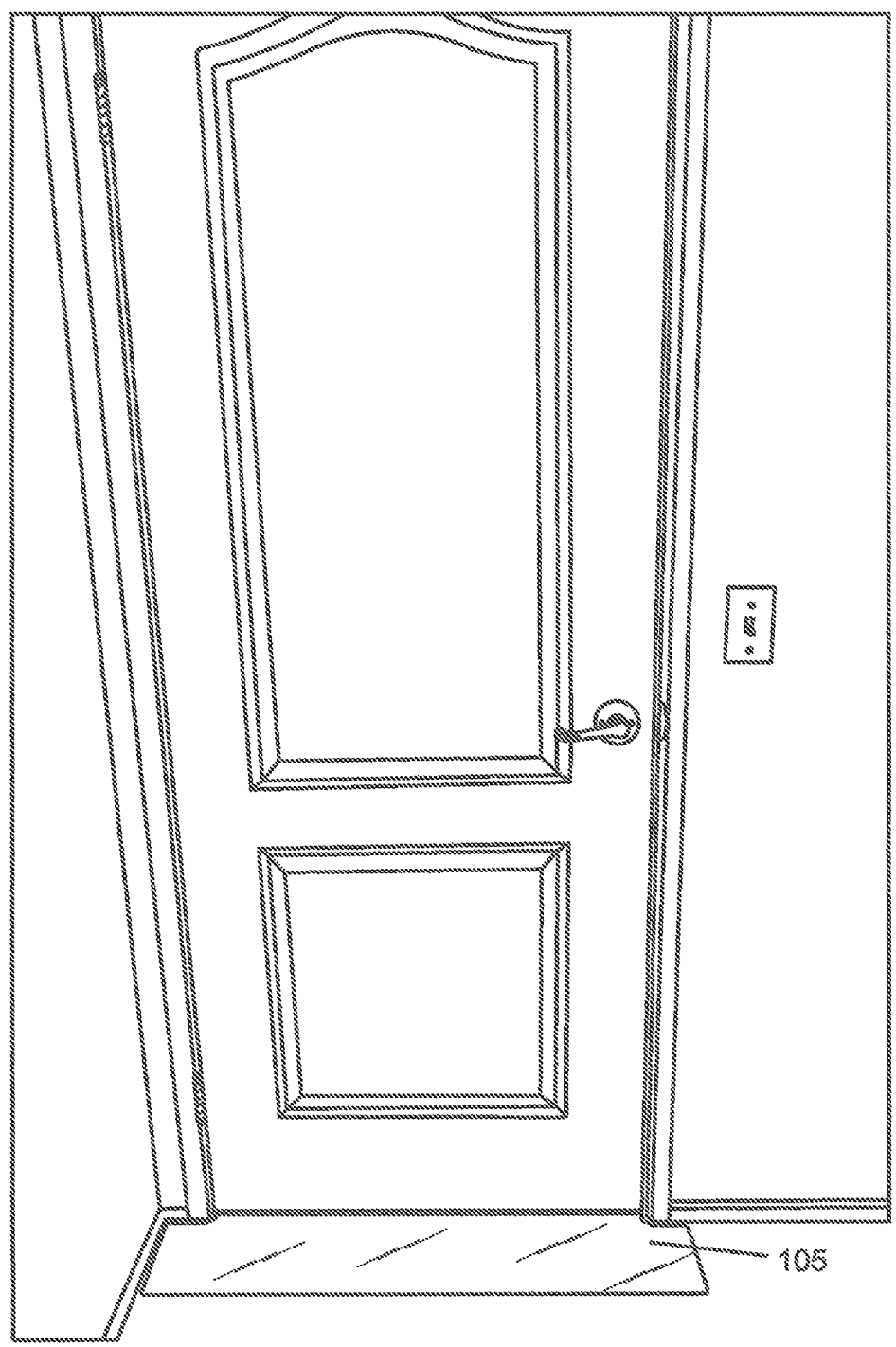
FIG. 3 shows the device 105 positioned in the doorway with the door closed.

FIG. 3 shows the device 105 positioned in the doorway with the door closed. As mentioned, the device is sufficiently thin such that it does not interfere with or otherwise impede opening and closing of the door over the device when the device is positioned in the doorway.

Figure 4:
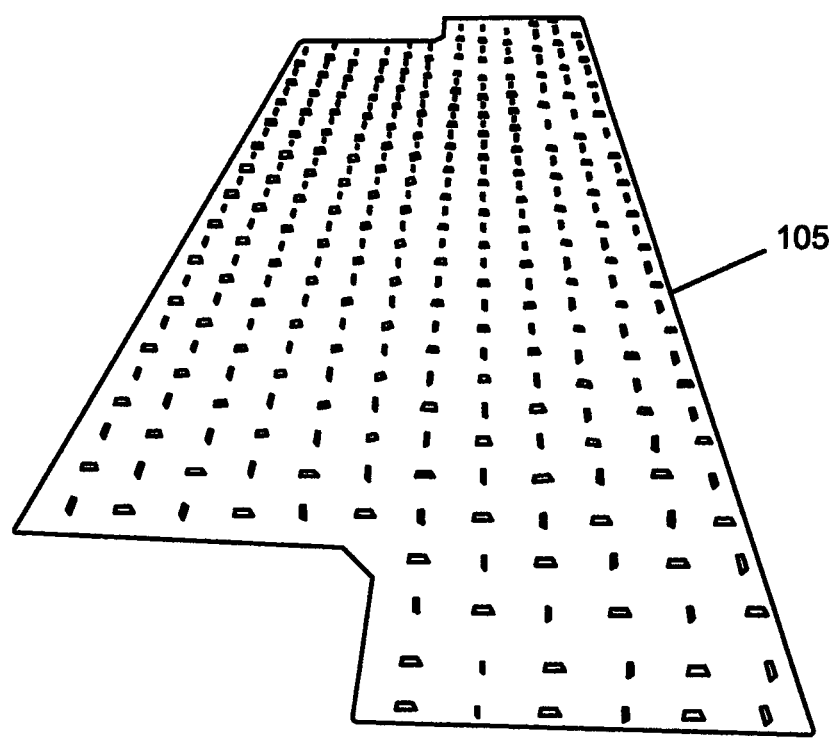
FIG. 4 shows a bottom view of a flooring guard with retention elements.

The bottom surface of the device can be equipped with one or more features that are configured to retain the device in a fixed position on the floor. For example, the device can have adhesive positioned on the bottom surface or it can have one or more spikes or protrusions that interact with the floor to retain the device in a fixed position relative to the doorway. As shown in FIG. 4, an embodiment of the device includes one or more protrusions that are configured to interact with carpeted floor in a manner that acts to retain the device in a fixed position on the floor. The protrusions can be shaped such that they minimize or eliminate the likelihood of the device sliding on the floor once positioned thereon.

Figure 5:
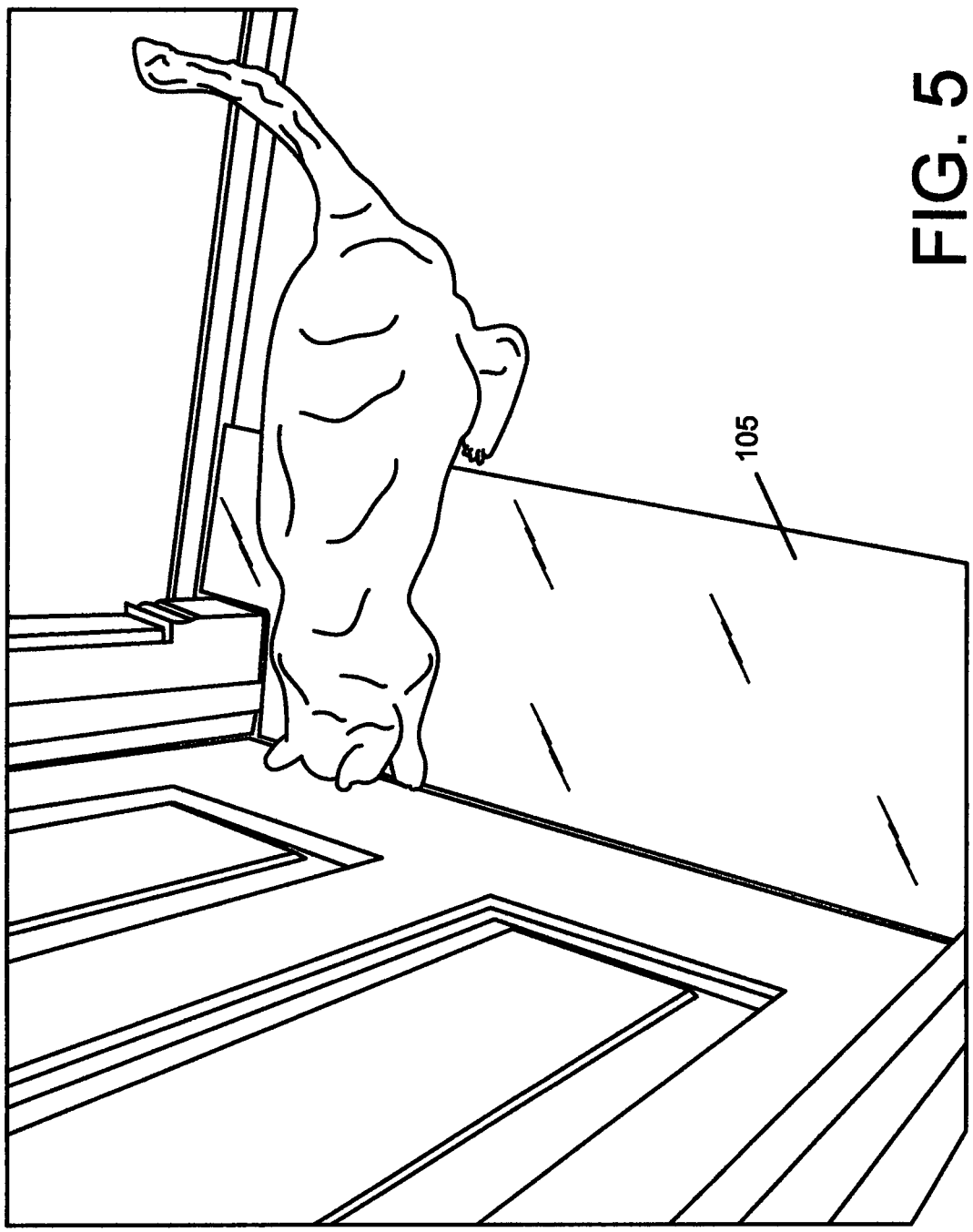
FIG. 5 shows a cat attempting to scratch the floor guard device.

Once the device is positioned in the doorway, it acts as a guard that protects the floor underneath. A pet, such as a cat, can try to scratch on top of the guard (as shown in FIG. 5), rather than the floor itself, such that the underlying floor is protected against damage from scratching. The functional benefits of the device can be seen virtually immediately; cats attempting to scratch the plastic surface are quickly discouraged as cats are not particularly enthused about scratching on sliding surfaces on which their claws can not connect and rip into, and they therefore soon give up. The plastic material specifically selected will not cause damage to the nails of cats. This is of additional importance in a nation where cat de-clawing is not only morally questionable and becoming increasingly more unpopular; it is already an illegal practice in many states and countries.

The device may be largely rectangular in shape, and can be specifically tailored to fit the outline and contours of doorways and adjoining walls and the target scratch areas. In an embodiment, the protection device extends approximately 6 inches on the side of the door (where scratching cat is located), and approximately 4 inches on the other side of the door once it is closed. As mentioned, in another embodiment the device does not extend into a second room but is sized to protect the doorway on the doorway side of only a single room. The side of the product targeting the anticipated scratch area also extends around both sides of the doorway frame (in the single room) by an additional length, such as 3¼ inches on each side of the door, providing additional carpet protection around the entire doorway. As shown in FIG. 2, the device can be sized such that one edge 220 extends into a room while an opposed edge 225 does not extend into the second room on the other side of the doorway. Thus, as discussed, the device is sized to protect only a single room on one side of the doorway. The device can also be used in the situation where one of the rooms is carpeted and the other room (on the other side of the doorway) is non carpeted.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. It should also be appreciated that sizes, materials, surface patterns and finishes can be altered to suit uses including extreme environments and loading to achieve required performance in those situations.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A device for protecting the area of a doorway configured to receive a standard sized door, the doorway defined by first and second doorjambs separated by a distance, the device comprising:
   a mat body having a protrusion with a first side edge and an opposed, second side edge, the protrusion sized and shaped to be positioned in the doorway between the first and second doorjambs, wherein:
   (a) the first and second side edges of the protrusion are separated by a first width so dimensioned as to be insertable through a space between the first and second doorjambs such that the first and second side edges do not simultaneously touch the first and second doorjambs when the mat body is properly positioned in the doorway configured to receive the standard sized door and such that there is 1/16 to 1 inch of play between the first side edge of the protrusion and the first doorjamb and 1/16 to 1 inch of play between the second side edge of the protrusion and the second doorjamb,
   (b) the mat body has a top surface and a bottom surface,
   (c) the 1/16 to 1 inch of play permits the device to fit within a doorway configured to receive a standard sized door without having to specifically build the device to the dimensions of the doorway,
   (d) the mat body includes a pair of wings having side edges separated by a second width, wherein the second width is greater than the first width, and wherein the second width is connected to each of the first and second side edges by an about 45-degree angle, and
   (e) the standard sized door is selected from the group consisting of a 28-inch door, a 30-inch door, a 32-inch door, a 34-inch door, and a 36-inch door.

2. The device as in claim 1, wherein the mat body is sized and shaped such that it extends into only a single room on one side of the doorway configured to receive the standard sized door.

3. The device as in claim 1, wherein the mat body is sized and shaped such that it does not extend past a threshold of the doorjambs into a second room and only extends into a single room on one side of the doorway configured to receive the standard sized door.

4. The device as in claim 1, wherein the first width is no more than one inch less than the distance that separates the first and second doorjambs.

5. The device as in claim 1, wherein the device is made out of plastic.

6. The device as in claim 5, wherein the plastic is transparent.

7. The device as in claim 6, wherein the plastic is sufficiently flexible such that it can conform to irregularities in the surface of a floor.

8. The device as in claim 1, wherein the device is configured to prevent a cat from scratching an area of carpet around the doorway configured to receive the standard sized door.

9. The device as in claim 1, wherein the device is generally rectangular in shape.

10. The device as in claim 1, wherein there is less than half an inch of play between the first side edge of the protrusion and the first doorjamb, and the second side edge of the protrusion and the second doorjamb.

11. The device as in claim 1, wherein there is less than 1/8" of play between the first side edge of the protrusion and the first doorjamb, and the second side edge of the protrusion and the second doorjamb.

12. The device as in claim 1, wherein the standard size door is the 30-inch door.

13. The device as in claim 1, wherein the bottom surface of the mat body comprises an adhesive or at least one protrusion configured to retain the device in a fixed position on a floor.

14. The device as in claim 1, wherein the standard size door is the 28-inch door.

15. The device as in claim 1, wherein the standard size door is the 32-inch door.

16. The device as in claim 1, wherein the standard size door is the 34-inch door.

17. The device as in claim 1, wherein the standard size door is the 36-inch door.

18. A system for protecting an area, the system comprising:
   (a) a doorway configured to receive a standard sized door, the doorway defined by a first doorjamb and a second doorjamb separated from the first doorjamb by a distance; and
   (b) a mat body having a protrusion with a first side edge and an opposed, second side edge, the protrusion sized and shaped to be positioned in the doorway between the first doorjamb and second doorjamb, wherein:
      (i) the first and second side edges of the protrusion are separated by a first width so dimensioned as to be insertable through a space between the first and second doorjambs such that the first and second side edges cannot simultaneously touch the first and second doorjambs when the mat body is properly positioned in the doorway configured to receive the standard sized door and such that there is 1/16 to 1 inch of play between the first side edge of the protrusion and the first doorjamb and 1/16 to 1 inch of play between the second side edge of the protrusion and the second doorjamb, (ii) the mat body has a top surface and a bottom surface, (iii) the 1/16 to 1 inch of play permits the device to fit within a doorway configured to receive a standard sized door without having to specifically build the device to the dimensions of the doorway, (iv) the mat body includes a pair of wings having side edges separated by a second width, wherein the second width is greater than the first width, and wherein the second width is connected to each of the first and second side edges by an about 45-degree angle, and (v) the standard sized door is selected from the group consisting of a 28-inch door, a 30-inch door, a 32-inch door, a 34-inch door, and a 36-inch door.

19. The system as in claim 18, wherein the mat body is sized and shaped such that it extends into only a single room on one side of the doorway configured to receive the standard sized door.

20. The system as in claim 18, wherein the mat body is sized and shaped such that it does not extend past a threshold of the doorjambs into a second room and only extends into a single room on one side of the doorway configured to receive the standard sized door.

\* \* \* \* \*

UNITED STATES PATENT AND TRADEMARK OFFICE
CERTIFICATE OF CORRECTION

Page 1 of 1

PATENT NO. : 10,694,878 B1
APPLICATION NO. : 14/304941
DATED : June 30, 2020
INVENTOR(S) : Bengt Johansson It is certified that error appears in the above-identified patent and that said Letters Patent is hereby corrected as shown below:

On the Title Page

Please correct item (72) as follows:
Replace "Inventor: Bengt Johansson, Norco, CA (US)" with -- Inventors: Bengt Johansson, Norco, CA (US), Joanne Hernandez, Norco, CA (US) --

Signed and Sealed this
Third Day of November, 2020

Andrei Iancu
*Director of the United States Patent and Trademark Office*